July 30, 1968  L. V. VOLKOBER  3,394,850
MEASURING AND DISPENSING DEVICE
Filed May 17, 1967
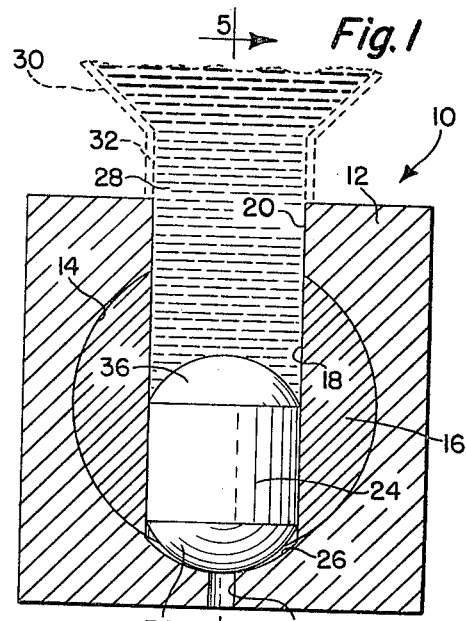
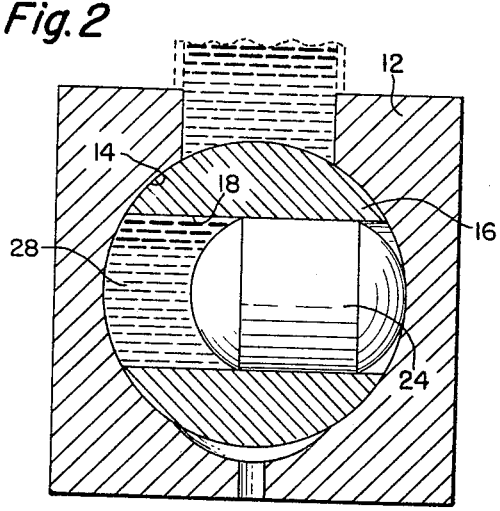
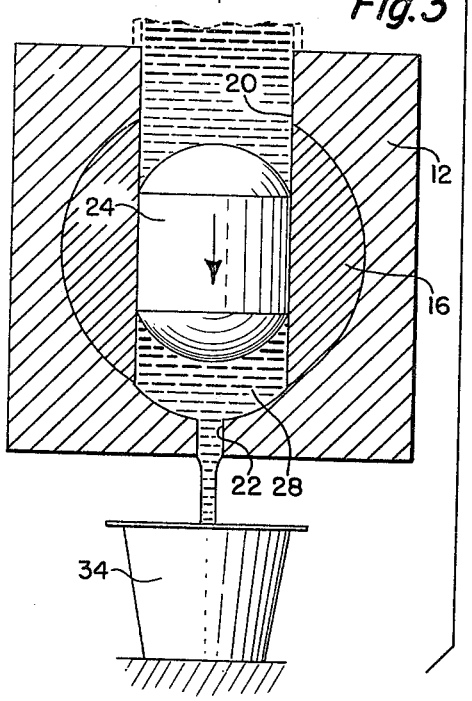
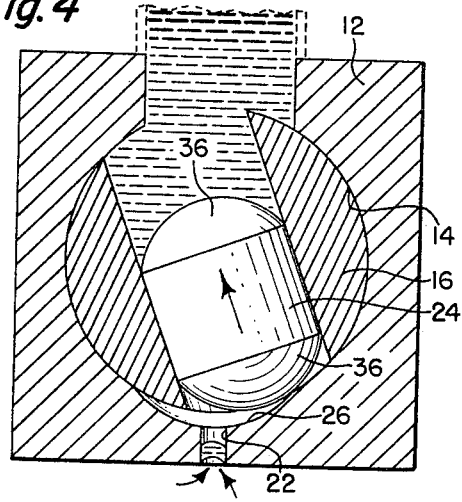
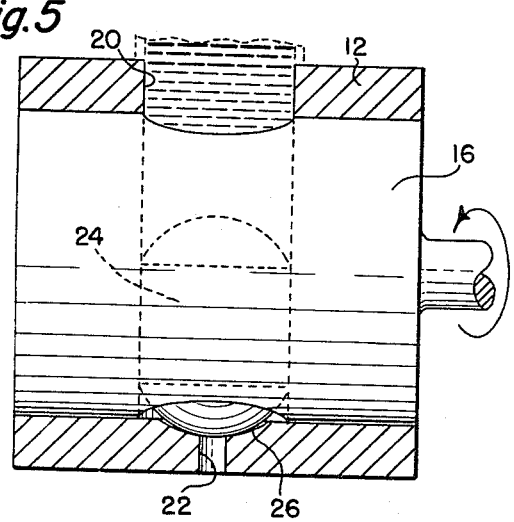
INVENTOR.
Louis V. Volkober
BY
His Att'ys United States Patent Office 3,394,850
Patented July 30, 1968

3,394,850
MEASURING AND DISPENSING DEVICE
Louis V. Volkober, Chicago, Ill., assignor to Illinois Tool Works Inc., Chicago, Ill., a corporation of Delaware
Filed May 17, 1967, Ser. No. 639,133
6 Claims. (Cl. 222—219)

ABSTRACT OF THE DISCLOSURE

A metering device for dispensing measured amounts of fluid which utilizes differential air pressure to minimize leakage.

Background of the invention (1) *Field of the invention.*—The dispensing of measured amounts of liquid, such as cream, coffee whitener and the like, from a dispensing device into individual container units which are moved along a conveyor requires precise and immediate dispensing on demand. In accordance with the customary practice, the conveyor is intermittently driven to position unfilled container units beneath a dispensing head, and the discharging of measured quantities from the dispensing head is synchronized with the movement of the conveyor. It will be apparent that once the container unit is positioned relative to the dispensing head for dispensing of a predetermined quantity of liquid, it is important that the dispensing head discharge only the measured quantity of liquid which is desired with there being no leakage or dripping between discharges. The present invention seeks to provide an improved measuring and dispensing device which utilizes differential air pressure to minimize dripping or leaking.

(2) *Description of the prior art.*—Devices for measuring and dispensing predetermined quantities of liquid have commonly taken the form of rotating elements provided with suitable openings or recesses of predetermined size for receiving a quantity of liquid from a supply tank at a first or upper position and for discharging the predetermined quantity of liquid through a fluid discharge opening at a second or lower position. Such devices are shown to be old in U.S. Patents Nos. 733,682 and 841,111. In certain forms of the prior art, the rotating elements have included a piston element, either of the free floating or mechanically driven variety, which operates in response to the movement of the rotating element to force material through a discharge opening, and exemplary references in this regard are U.S. Patents Nos. 1,861,734 and 1,867,998. The present invention relates to this last type of measuring and dispensing device which includes both rotating and piston elements.

Summary of the invention

It is one object of the present invention to provide a measuring and dispensing or metering device for dispensing measured amounts of liquid while minimizing and preventing leakage or dripping between the dispensing of measured amounts.

More specifically, it is an object of the present invention to provide a measuring and dispensing or metering device for fluid material which creates a mechanically induced suction for retaining post fill residual fluid until the next discharging or dispensing action.

Other objects of the present invention include a metering device which, in addition to the above objects, is extremely simple in structure and operation, formed from a minimum number of parts, can be easily incorporated within present dispensing heads, has a relatively long life, and is durable both from a wear and corrosion standpoint.

These and other objects and advantages of the present invention are attained by the provision of a metering device which dispenses measured amounts of fluid and includes a housing having a bore therethrough for receiving a rotatable member, said rotatable member being provided with a through passageway which is transverse to the housing bore for communication with fluid receiving and discharge openings in said housing, a piston element confined within the through passageway and capable of being reciprocated in response to the movement of said rotatable element, said piston element being moved to a retracted position when one end of the through passageway in which it moves is aligned with the fluid receiving passageway to permit fluid material to enter the through passageway, said piston element being moved to a second position in response to the movement of said rotatable element for forcing the fluid material from the through passageway and past the fluid discharge opening, and a recess provided in said housing adjacent the fluid discharge opening for receiving one end of said piston element after the expulsion of said fluid material past said fluid discharge opening, the continued movement of said rotatable member urging said piston element within the confines of said housing bore to draw air through the fluid discharge opening in an opposite direction to the movement of said fluid material to prevent leakage between discharges of measured fluid amounts.

Brief description of the drawing

FIG. 1 is a sectional view illustrating the components of the metering device constructed in accordance with the teachings of the present invention;

FIG. 2 is a sectional view of the metering device illustrating the capture of a predetermined amount of fluid within components of the metering device;

FIG. 3 is a sectional view depicting the manner in which the fluid material trapped within the metering device is dispensed through a fluid discharge opening thereof into a container body;

FIG. 4 is a sectional view of the metering device after the fluid has been dispensed through the fluid discharge opening, and showing the manner in which the components of the metering device provide a mechanically induced suction to retain post fill residual fluid until the next discharging or dispensing action; and FIG. 5 is a side elevational view, partly in section as viewed along lines 5—5 of FIG. 1 illustrating the relationship of the components of the metering device in the position shown in FIG. 1 from another vantage point.

Description of the preferred embodiment

While the metering device of the present invention has particular utility in dispensing of liquid food products such as cream, coffee whitener and the like in a high speed container filling and sealing machine such as disclosed for example in co-pending application Ser. No. 379,250, filed on June 30, 1964, now Patent No. 3,343,336, it will be recognized that the metering device of the present invention may be used in any instance where it is desired to provide precise and immediate dispensing of predetermined amounts of fluid without leakage or dripping between discharges.

The metering device generally identified 10 in FIG. 1 of the drawing includes a housing or block 12 having a bore 14 therethrough for receiving a rotor or rotatable member 16 which, in turn, is provided with a through passageway 18 capable of communicating with upper and lower fluid receiving and discharge openings 20, 22 respectively formed in the housing, the through passageway 18 of the rotor 16 having a piston element or floating check 24 confined therein which reciprocates in response to the movement of the rotor 16 to accept and discharge a predetermined quantity of fluid as will be set forth in detail below. The metering device 10 further includes, as an important feature of the present invention, a recess or depression 26 formed in the housing 12 adjacent the fluid discharge opening 22 and projecting radially outwardly from the housing bore 14, but merging therewith at the outer marginal portion of the recess 26. The utilization of the recess 26 in conjunction with the operation of the other components of the metering device 10 will become apparent hereinafter.

Fluid 28 is received by the metering device 10 preferably from a supply tank or reservoir partially shown in phantom lines in FIG. 1 of the drawing. The fluid reservoir 30 when used, also preferably, has a neck portion 32, the internal diameter of which is generally equal to the internal diameter of the fluid receiving opening 20 of the metering device such that fluid may be quickly moved from the fluid reservoir 30 into the metering device 10. The filling position of the metering device 10 is illustrated in FIG. 1 of the drawing where the piston element 24 is in its lowermost or retracted position, just having dispensed a predetermined quantity of liquid through the fluid discharge opening 22. Fluid from the fluid reservoir 30 can thus be moved into those portions of the through passageway 18 in the rotor immediately above the piston element 24.

Once the space of the through passageway 18 immediately above the piston element 24 has been completely filled with the fluid, the rotor 16 is now ready to be moved to trap a predetermined quantity of liquid for subsequent dispensing thereof. This is readily depicted in FIG. 2 of the drawing wherein the rotor 16 is shown as having been moved approximately 90° to illustrate the manner in which a predetermined quantiy of fluid is trapped within the metering device 10. Specifically, it will be seen that the wall of the housing bore 14 traps or captures a predetermined quantity of fluid 28 within the through passageway 18 which is immediately above the piston element 24. It will be recognized that close manufacturing tolerances on the order of .001 between, for example, the piston element 24 and the through passageway 18 as well as the rotor 16 and the housing bore 14 are employed to prevent the entry of fluid between these cooperating elements of the metering device.

Operation of the rotor 16, in a container filling and sealing machine, will be synchronized with the movement of the containers such that the metering device 10 will dispense the desired quantity of fluid to adjacently positioned container bodies in continuous fashion. Therefore, the rotor 16 is mechanically driven by a drive mechanism (not shown) which is synchronized with the conveyor means (not shown) for transporting the container bodies through the container filling and sealing machine. The piston element 24 is, on the other hand, of the free floating variety in the sense that its movement is controlled by gravitational forces as it is moved to various positions in response to the movement of the rotor 16. If desired, the piston element 24 could be mechanically reciprocated although it has been found that this will normally not be needed.

The movement of the rotor 16 from the filling position of FIG. 1 through the fluid transporting phase of FIG. 2 to the fluid discharging position of FIG. 3 requires very little time in the operation of the metering device. In FIG. 3 of the drawing, it will be seen that the rotor 16 has moved through a 180° path from the FIG. 1 filling position, thereby aligning the fluid trapped within the rotor 16 with the fluid discharge opening 22. When this occurs, the piston element 24, since it is no longer subjected to centrifugal forces, falls by gravity forcing the fluid 28 trapped by the rotor through the fluid discharge opening 22 into a container body 34 which is aligned with the fluid discharge opening 22. It will be noted that as the piston element 24 evacuates the fluid trapped within the rotor 16 on one side thereof, the other side of the piston element opens up the opposite end of the through passageway 18 permitting fluid 28 to be admitted thereto through the fluid receiving opening 20. Thus, little time is lost in the filling and dispensing operations.

It has been found that all of the fluid cannot be evacuated during a dispensing operation, thus creating what has been commonly referred to in dispensing devices as "post fill drip." This phenomenon is quite common and can hinder or interfere with subsequent sealing operations as the leakage or dripping of liquids onto the rims areas of the container body not only creates an unsightly, messy appearance, but creates problems in the subsequent heat sealing of a lidding member to the container body. Further, to insure that only a predetermined or measured amount of fluid is dispensed, some control over "post fill drip" must be found.

In the present invention, the "post fill drip" is controlled by means of a mechanically induced suction which draws air up through the fluid discharge opening once the dispensing operation is completed to retain any residual fluid within the metering device until the next discharge or dispensing action. This is accomplished in the present invention by the coaction between the recess 26 and the piston element 24.

When the dispensing of a predetermined quantity of fluid has been completed, the piston element 24 will be moved into the recess or cavity 26 as shown in FIGS. 1 and 5. Subsequent movement of the rotor 16 will cause the piston element 24, as seen in FIG. 4 of the drawing, to be moved from the recess 26 into the housing bore 14, and this creates a slight vacuum or "suck back" on the fluid discharge opening 22 drawing air, as illustrated by the arrows in FIG. 4, up into the fluid discharge opening 22. This mechanically induced vacuum minimizes dripping or leakage exerting pneumatic forces on any residual liquid. In this way, the metering device performs its dispensing function while at the same time minimizing or preventing "post fill drip" between discharges.

It will be noted that opposite ends of the piston elements 24 are rounded as at 36 to accomplish the above mechanically induced vacuum without creating any unnecessary wear or interference with the operation of the rotor 16. The amount of curvature for the ends 36, 36 of the piston element 24 as well as for the recess or cavity 26 may be varied within prescribed limits as will be apparent to obtain the results desired. Further, it will be understood that the housing 12 may be elongated to accommodate an elongated rotor 16 having a plurality of discrete through passageways 18, a piston element 24 within each such through passageway, etc, to permit a corresponding number of containers to be filled at the same time.

From the foregoing, it will now be appreciated that the present invention provides a metering device which is capable of precise and immediate dispensing on demand, and at the same time which minimizes or altogether prevents leakage or dripping between fluid discharges.

While the preferred embodiment of the present invention has been shown and described herein, it is obvious that many structural details may be changed without departing from the spirit and scope of the appended claims.

I claim:
1. A metering device for dispensing measured amounts of fluid comprising a housing having a bore therethrough for receiving a rotatable member, said rotatable member being provided with a through passageway which is transverse to the housing bore for communication with fluid receiving and discharge openings in said housing, a piston element confined within the through passageway and capable of being reciprocated in response to the movement of said rotatable element, said piston element being moved to a retracted position when one end of the through passageway in which it moves is aligned with the fluid receiving passageway to permit fluid material to enter said through passageway, said piston element being movable to a second position in response to the movement of said rotatable element for forcing the fluid material from the through passageway past the fluid discharge opening, and a recess provided in said housing adjacent the fluid discharge opening for receiving one end of said piston element after the expulsion of said fluid material past said fluid discharge openings, the continued movement of said rotatable member urging said piston element within the confines of said housing bore to draw air through the fluid discharge opening in an opposite direction to the movement of said fluid material to prevent leakage between the discharge of measured fluid amounts.

2. A metering device as defined in claim 1 wherein said piston element is of the free floating variety.

3. The metering device as defined in claim 1 wherein each end of said piston element is rounded for easy entry within and removal from the recess provided in said housing.

4. The metering device as defined in claim 1 where each rotatable member is provided with a plurality of discrete through passageways each capable of receiving a corresponding number of piston elements which cooperate with recesses aligned therewith in the aforementioned manner.

5. The metering device as defined in claim 1 wherein the fluid receiving opening is substantially the same width as the through passageway provided in said rotatable member.

6. The metering device as defined in claim 1 wherein the fluid discharge opening is substantially smaller than the through passageway provided in said rotatable member.

References Cited
UNITED STATES PATENTS

| | | | |
|---|---|---|---|
| 1,861,734 | 6/1932 | Bergmann | 222—219 X |
| 3,125,136 | 3/1964 | Miller et al. | |
| 3,053,418 | 9/1962 | Jordan | 222—219 X |

ROBERT B. REEVES, *Primary Examiner.*

N. L. STACK, *Assistant Examiner.*